G. A. BAKER.
INDICATOR ATTACHMENT FOR WATER GAGES.
APPLICATION FILED SEPT. 6, 1917.
1,264,752.  Patented Apr. 30, 1918.
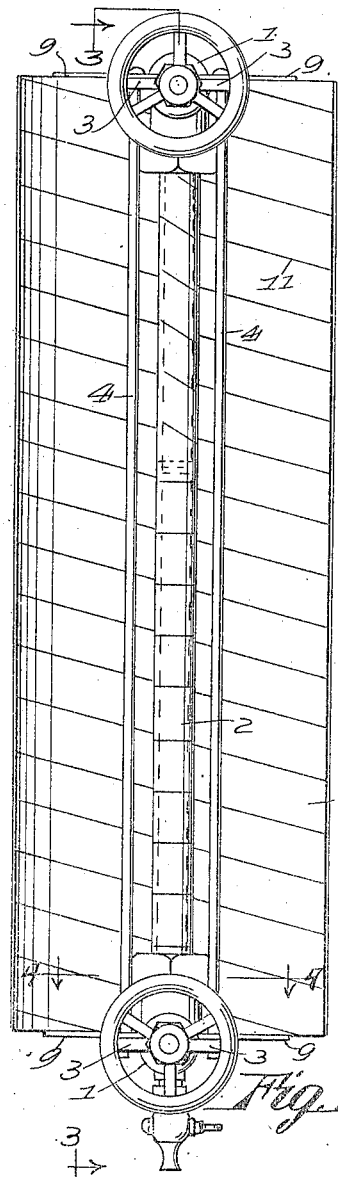
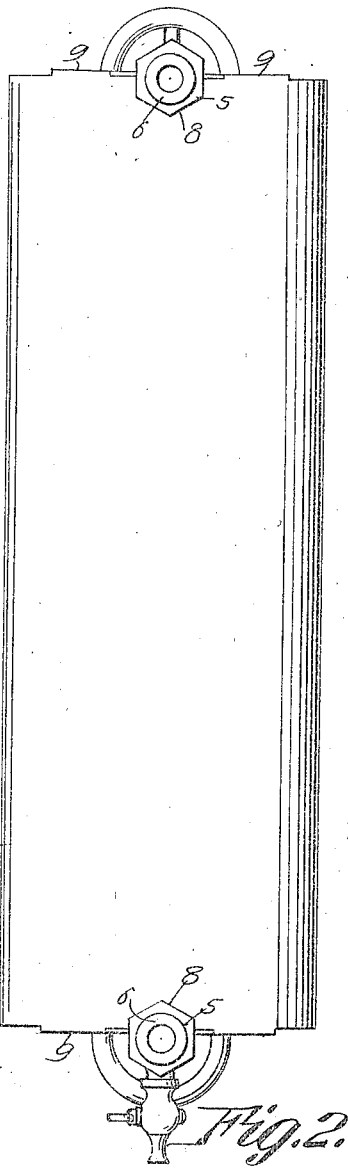
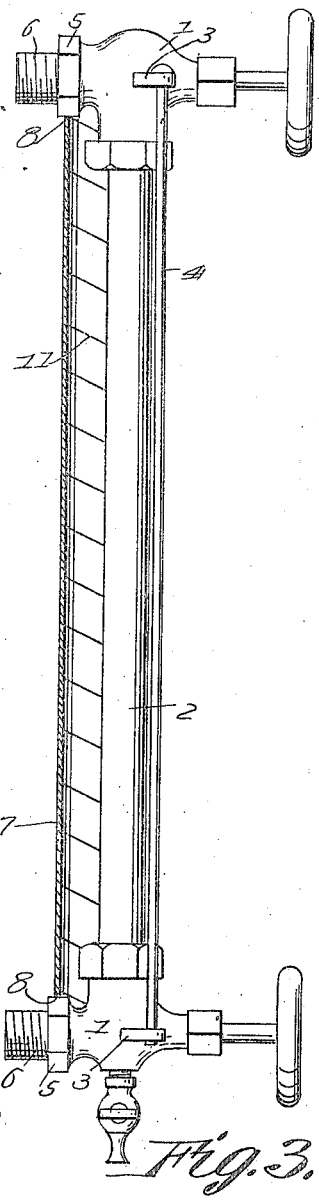
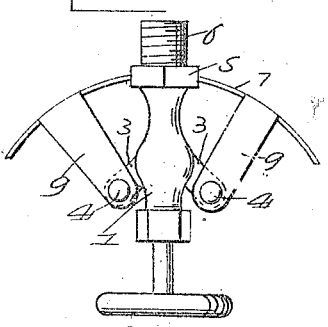
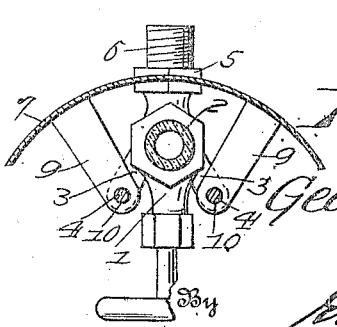
Inventor
George A. Baker,
By
Attorney

UNITED STATES PATENT OFFICE.

GEORGE A. BAKER, OF MIAMI, FLORIDA.

INDICATOR ATTACHMENT FOR WATER-GAGES.

1,264,752.  Specification of Letters Patent.  Patented Apr. 30, 1918.

Application filed September 6, 1917. Serial No. 190,074.

*To all whom it may concern:*

Be it known that I, GEORGE A. BAKER, a citizen of the United States, residing at Miami, in the county of Dade and State of Florida, have invented new and useful Improvements in Indicator Attachments for Water-Gages, of which the following is a specification.

The present invention relates broadly to improvements in water gages, and more particularly has reference to an indicator attachment for water gages.

As the primary aim and object this invention contemplates the provision of an indicator attachment for water gages designed to be attached in the rear of the glass of the gage for presenting in a horizontal position the image of slanting graduations upon the card or panel of an indicator in consequence of the refractory properties of the water or liquid within the gage in order to quickly and positively warn the inquisitor of the condition of the boiler.

A coördinate object of the invention is to provide means in connection with a water gage for accentuating the image of the graduations in that portion of the gage containing water in order to prevent mistakes due to carelessness, inadvertence or inaccurate identification of the height of water in the gage with certain of a plurality of similar and equally distant images.

Another object of the invention is to provide a water gage attachment which is very simple in structure and inexpensive in manufacture and one which is adapted for use by those not particularly skilled in scientific or mechanical pursuits.

With the above and other objects in view, the present invention consists in the combination and arrangement of parts hereinafter more fully described, illustrated in the accompanying drawings and particularly pointed out in the appended claim, it being understood that changes may be made in the form, proportion, size and minor details without departing from the spirit of the invention.

The invention is clearly illustrated in the accompanying drawings, in which:—

Figure 1 is a front elevation of the water gage showing the indicator attachment in an operative position with reference thereto;

Fig. 2 is a rear elevation of the invention in position;

Fig. 3 is a vertical section taken on line 3—3 of Fig. 1;

Fig. 4 is a transverse section taken on line 4—4 of Fig. 1 in the direction in which the arrows point;

Fig. 5 is a top plan view of the invention.

Similar characters of reference are employed in all of the above described views to indicate corresponding parts.

Referring now, more particularly, to the accompanying drawings, there is provided a water gage embodying generally angle valves 1 between the casings of which valves a glass tube 2 is connected and arranged in communication therewith, while ears 3 project from opposite sides of the casings and receive rods 4 designed for protecting the glass. Hexagonal portions 5 are formed adjacent the threaded attaching nipples 6 on the casings and in addition to facilitating the attaching of the water gage accomplish another purpose which will presently appear.

In carrying out the invention a strip or panel 7 is employed and is preferably formed from an elongated piece of sheet metal or the like arranged in an arcuate form in cross section. This panel is positioned behind and adjacent to the glass tube 2 and is provided in its upper and lower edges with recesses 8 positioned midway the side edges and designed so as to be arranged about and in abutting relation with the hexagonal portions 5 for coöperating with the latter so as to be prevented from having vertical or transverse movement with respect to the water gage. In further securing the strip or panel 7 in position, arms 9 are desirably integral with the upper and lower edges of the panel adjacent the side edges projecting at right angles from the indicating face thereof being incidentally arranged in converging relation with respect to each other and formed with openings 10 adjacent their terminals. The arms rest upon the upper surface of the ears 3 preparatory to the engagement of the rods with the ears. Subsequent to this positioning the rods are inserted through both the openings in the arms and in the ears and coöperate with the arms in positively preventing accidental displacement of the panel from position.

The front face of the panel is provided with a plurality of parallel and slanting graduations 11 while the surface of the strip or panel is preferably light colored in order that light rays falling thereupon will be reflected through a portion of the gage glass. The light rays reflected from the surface of the strip or panel 4 will be refracted upon passing through the water filled portion of the gage glass to cause the image of the graduations 11 to appear in a horizontal position, thus immediately acquainting the inquisitor of the height of the water in the gage glass by exhibiting the number of graduations in a manner readily detected by the eye. In that portion of the glass containing air or steam and above the level of the water, an entirely different result is produced, since it can be seen that all the light falling upon that portion of the glass cannot, according to the general law of total internal reflection, pass through the glass, whereby the panel or sheet adjacent to that portion of the glass will appear indistinct and a portion of the surface of the glass will reflect the light falling thereupon, while the sides of the glass will present a drab, opaque appearance.

The distinction between the appearance of the water filled portion of the gage glass and the air filled portion of the gage glass will positively acquaint one desiring information as to the condition of the boiler by the quantity of water contained in the boiler as indicated by its height in the glass. The difference between the appearance of the graduations upon the card or panel and their image as reflected in the portion of the gage glass containing water will materially decrease mistakes due to carelessness or inadvertence.

It is obvious that the invention herein set forth is susceptible to changes and modifications involving mechanical skill which may be made within the scope of the claim without departing from the spirit thereof. I do not, therefore, desire to be understood as limiting myself to the precise constructions of the parts shown in the drawings.

Having thus fully described this invention, what is claimed as new and desired to be secured by Letters-Patent, is:—

The combination with a water gage embodying angle valve casings, valves operably arranged therein, a glass tube between the casings and in communication therewith, ears projecting from opposite sides of the casings, hexagonal portions on the casings and guard rods engageable with the ears of an elongated panel arcuate in cross section and arranged vertically behind the two casings and provided in its upper and lower edges with recesses for abutting relation with the adjacent hexagonal portions so as to be prevented from having longitudinal and transverse movement, arms extending at right angles from the upper and lower edges of the panel and arranged in converging relation with respect to each other and provided with openings engageable by the rods subsequent to the arranging of the arms on the ears for assuring of the retention of the panel, the front face of the panel being provided with a plurality of uniformly spaced slanting graduations arranged in parallel relation with respect to each other and refracted by the water in the tube to present horizontal lines the upper of which is indicative of the level of the water in the tube.

In testimony whereof I affix my signature.

GEORGE A. BAKER.